(12) United States Patent
Argue et al.

(10) Patent No.: US 9,373,230 B2
(45) Date of Patent: Jun. 21, 2016

(54) CUSTOMER REPRINT OF A PHYSICAL RECEIPT FROM AN ELECTRONIC RECEIPT

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 636 days.

(21) Appl. No.: 13/665,784

(22) Filed: Oct. 31, 2012

(65) Prior Publication Data

US 2014/0122273 A1 May 1, 2014

(51) Int. Cl.
 G07G 1/12 (2006.01)
 G07G 5/00 (2006.01)
 G06Q 20/20 (2012.01)
 G06Q 20/04 (2012.01)

(52) U.S. Cl.
 CPC .............. *G07G 5/00* (2013.01); *G06Q 20/0453* (2013.01); *G06Q 20/20* (2013.01); *G06Q 20/209* (2013.01)

(58) Field of Classification Search
 CPC .................................................. G06Q 20/209
 USPC ............................................................. 705/24
 See application file for complete search history.

(56) References Cited

U.S. PATENT DOCUMENTS

| | | | |
|---|---|---|---|
| 5,739,512 A | 4/1998 | Tognazzini | |
| 6,067,529 A | 5/2000 | Alperovich | |
| 6,341,353 B1 | 1/2002 | Herman | |
| 6,487,540 B1 | 11/2002 | Smith | |
| 7,487,912 B2 | 2/2009 | Seifert | |
| 7,685,020 B2 | 3/2010 | Do | |
| 8,296,229 B1 | 10/2012 | Yellin | |
| 2001/0029484 A1 | 10/2001 | Schultz | |
| 2002/0133418 A1* | 9/2002 | Hammond et al. | 705/26 |
| 2003/0004811 A1* | 1/2003 | Omori | G06Q 20/0453 705/17 |
| 2007/0050258 A1* | 3/2007 | Dohse | 705/14 |
| 2007/0272740 A1* | 11/2007 | Palacios | 235/380 |
| 2009/0164344 A1 | 6/2009 | Shiftan | |
| 2009/0271265 A1 | 10/2009 | Lay | |
| 2011/0161230 A1 | 6/2011 | Singh | |
| 2011/0251892 A1* | 10/2011 | Laracey | G06Q 30/0253 705/14.51 |
| 2011/0307318 A1* | 12/2011 | LaPorte et al. | 705/14.33 |
| 2012/0271725 A1* | 10/2012 | Cheng | 705/21 |
| 2012/0280040 A1* | 11/2012 | Carney et al. | 235/383 |
| 2012/0284101 A1* | 11/2012 | Schiller | G06Q 30/06 705/14.23 |

(Continued)

FOREIGN PATENT DOCUMENTS

WO WO0114995 A2 3/2001
WO WO0131535 A1 5/2001

(Continued)

*Primary Examiner* — Hunter Wilder
(74) *Attorney, Agent, or Firm* — Howard & Howard Attorneys PLLC

(57) ABSTRACT

A method is disclosed for reprinting a paper copy of a receipt at a physical store location and based off of an electronic receipt. The electronic receipt may be viewed on a mobile electronic device with electronic receipts software thereon. A customer may pair their mobile electronic device with a POS terminal in a store location. Information may be sent to a server or computer system to request that a receipt be reprinted. The server may then process the request and transmit receipt information to the POS terminal where a paper copy of the receipt is printed for the customer.

21 Claims, 12 Drawing Sheets

(56) References Cited

U.S. PATENT DOCUMENTS

| | | | |
|---|---|---|---|
| 2012/0290609 A1* | 11/2012 | Britt | 707/769 |
| 2013/0085887 A1* | 4/2013 | Zhang | 705/26.8 |
| 2013/0085897 A1* | 4/2013 | Favoretto | 705/27.1 |
| 2013/0117078 A1* | 5/2013 | Weik et al. | 705/13 |
| 2013/0132202 A1* | 5/2013 | Gordon et al. | 705/14.58 |
| 2013/0339165 A1* | 12/2013 | Calman | 705/16 |
| 2014/0067575 A1* | 3/2014 | Nevada | 705/24 |

FOREIGN PATENT DOCUMENTS

| | | |
|---|---|---|
| WO | WO0195170 A2 | 12/2001 |
| WO | WO2010111591 A1 | 9/2010 |

* cited by examiner

… (US 9,373,230 B2)

CUSTOMER REPRINT OF A PHYSICAL RECEIPT FROM AN ELECTRONIC RECEIPT

RELATED U.S. APPLICATION

This application is related to U.S. application Ser. No. 13/665,804, filed Oct. 31, 2012. The application is incorporated herein by reference for all purposes.

BACKGROUND

1. Field of the Invention

This invention relates to receipts and receipt management systems and more particularly to systems and methods for allowing a customer to reprint a physical receipt from an electronic receipt.

2. Background of the Invention

Many point-of-sale (POS) systems currently in use today do not support important emerging technologies. For example, current POS systems are limited in their ability to handle electronic receipts and to handle subsequent transactions based on electronic receipts. As a result, the adoption of electronic receipts is hindered or prevented by the inability to provide the functionality associated with a paper receipt or to adequately handle subsequent transactions such as returns. Accordingly, what is needed is a system and method for facilitating use of electronic receipts.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
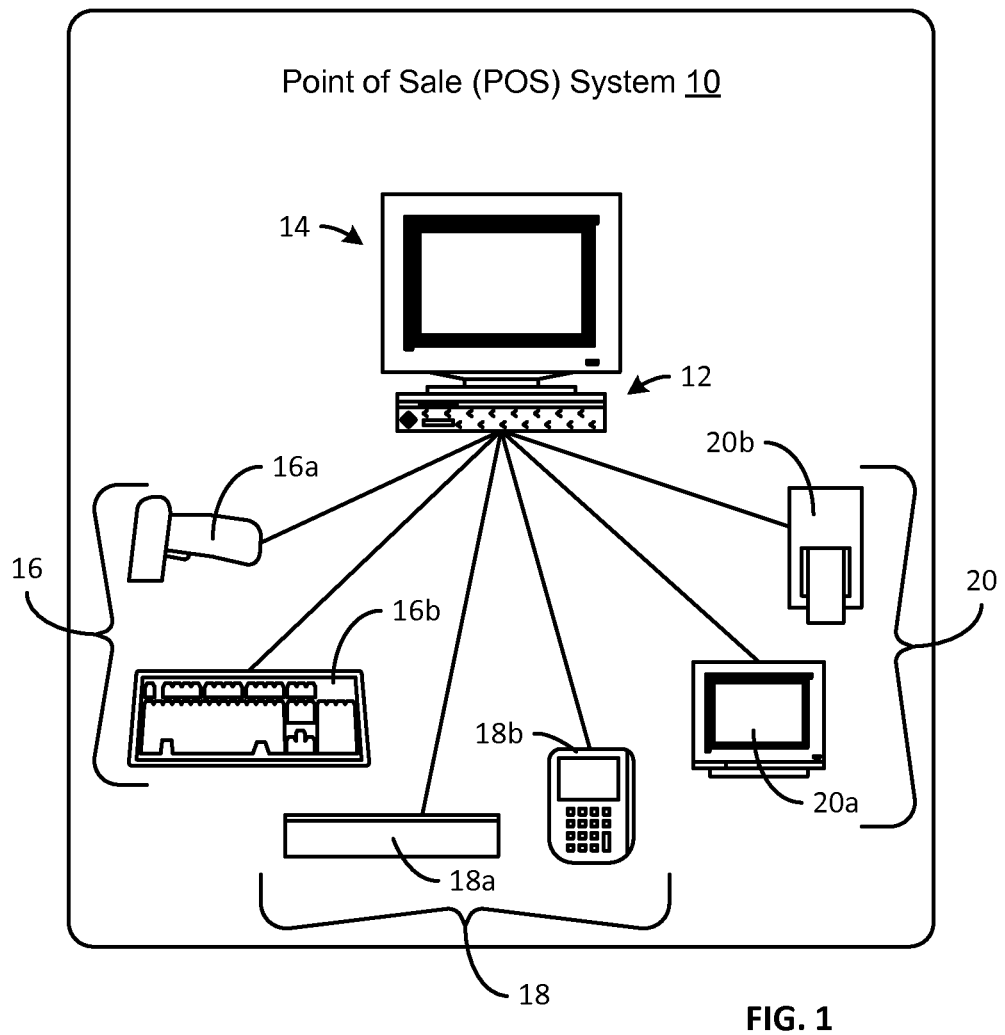
FIG. 1 is a schematic block diagram of one embodiment of a point-of-sale (POS) system for implementing methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide a system and methods managing receipts and for printing paper receipts where a customer may have initially received an electronic receipt. In some instances, a customer may need a paper copy of a receipt where they had received an electronic receipt for a previous purchase at a store.

In selected embodiments, a customer may utilize a mobile electronic device, such as a smart phone or tablet. An electronic receipt may be displayed or managed on the mobile electronic device and the device may include software which allows the customer to manage receipts. The software may allow the customer to interface with the electronic receipt, with the POS system, or with back-office/supervisory receipts management systems.

In certain embodiments, a machine-readable code may be used to interact between the customer's mobile electronic device and the POS system. The machine readable code may comprise a conventional barcode or a two-dimensional bar-code (e.g., a Quick Response (QR) Code). The data encoded within a machine-readable code may vary between different embodiments and different purposes or goals of the embodiment. In selected embodiments, a machine-readable code may encode a transaction identification (ID) uniquely identifying a particular transaction (e.g., purchase, return, or the like). Alternatively, or in addition thereto, a machine-readable code may encode data regarding the POS terminal and/or the store where the terminal is located.

In general, the purpose of a receipts system is to facilitate handling of receipts in a manner which is convenient to the customer and which also provides a desired measure of security. Many challenges arise in using electronic receipts. In particular, the use of electronic receipts when returning items raises a variety of challenges in ensuring that the returns process is handled in compliance with store policy and in ensuring that the store records and information about the initial sale transaction and the return transaction match the receipts maintained by the customer. For example, it is typically desirable to provide some security whereby a customer cannot easily complete a return for a product which they have not purchased or for a product which they have already returned. It is also desirable to make the receipts management process streamlined and convenient, as this improves the customer experience as well as reduces the store workload.

In managing receipts, it may often be desirable to update the receipt which the customer possesses or provide a more complete receipt history to the customer. This may ensure that the customer has accurate information about previous transactions.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support providing electronic receipts to customers and to support the reprint of paper receipts from electronic receipts.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
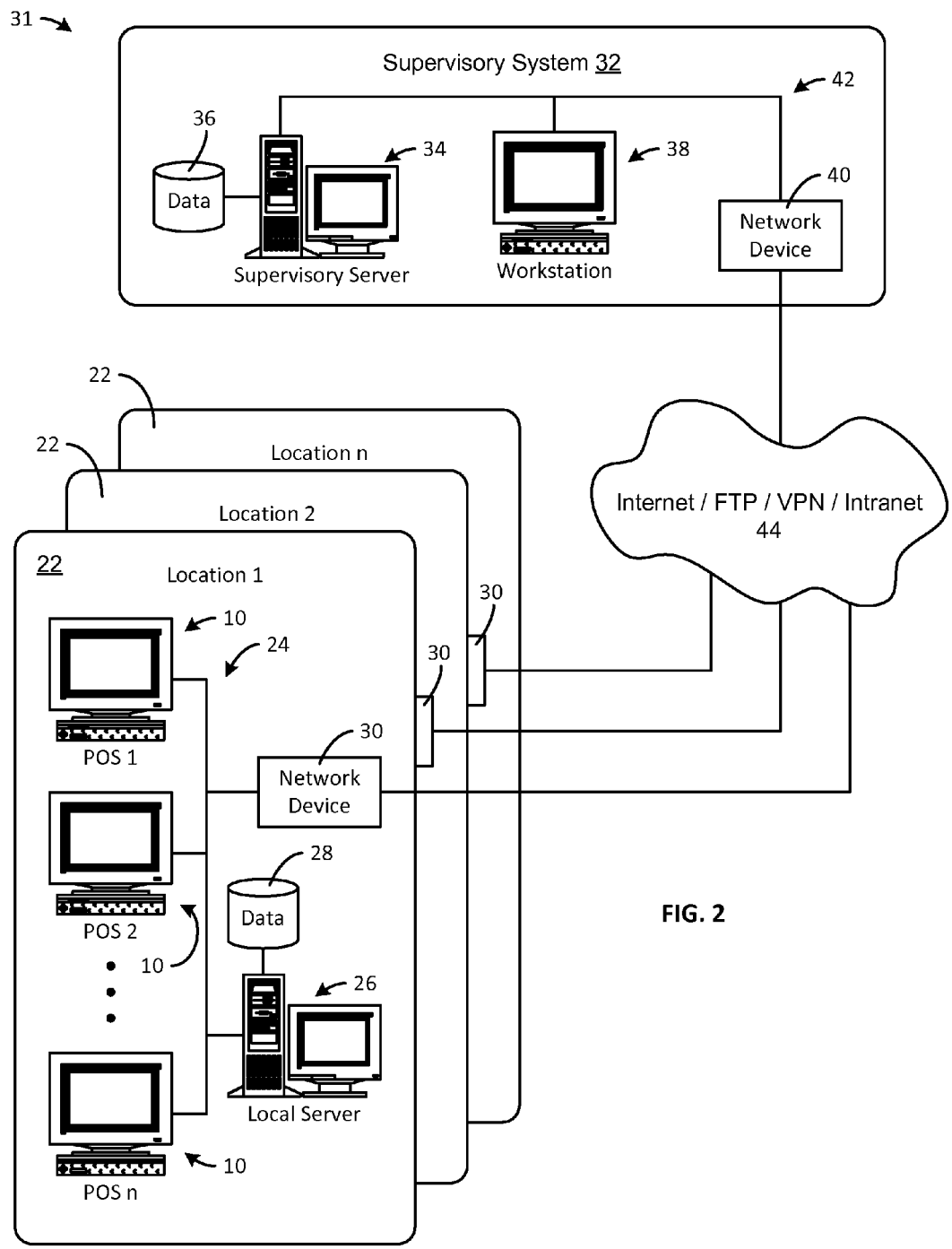
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system 32.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

It is thus appreciated that in discussing the functionality of the various POS terminals and servers, the present invention may be implemented in a system contained within a single location or across multiple locations. By way of example, the functionality accomplished by a server or computer, such as storing, processing, and transmitting receipt information, may be accomplished by a local computer or a remote computer such as servers 26 and 34.

Figure 3:
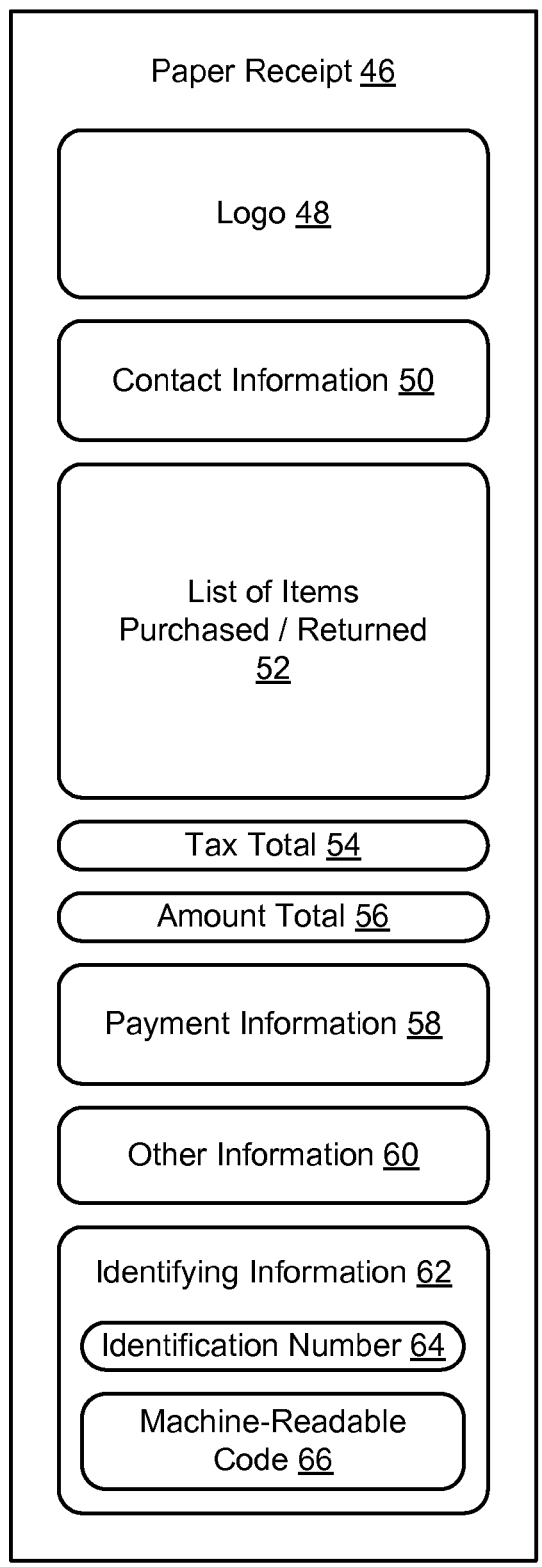
FIG. 3 is a schematic block diagram of one embodiment of a receipt in accordance with the present invention.

Referring to FIG. 3, in selected embodiments in accordance with the present invention, a POS system 10 may output a receipt 46. For example, a printer 20b of a POS system 10 may output a paper receipt 46. A receipt 46 may perform various functions. Primarily, a receipt 46 may document a financial transaction (e.g., sale or return). In selected embodiments, a receipt 46 may include a logo 48, contact information 50, a list 52 of items purchased or returned, a total 54 indicating the sales tax assessed or returned, a total 56 indicating 56 the amount paid or returned, payment information 58, other information 60, or the like or combinations or sub-combinations thereof.

By including contact information 50 on a receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within a receipt 46 as desired or necessary. In selected embodiments, a receipt 46 may include identifying information 62. Information 62 may include an identification number 64 which identifies the particular transaction associated with the receipt 46. Additionally, the identifying information 62 may include a machine-readable code 66. The code 66 may also provide information to identify the transaction associated with the particular receipt 46. The identifying information may include information such as the store where the items were purchased, the time of purchase, the total price of the transaction, etc.

A machine-readable code 66 may comprise a barcode. For example, in certain embodiments, a machine-readable code 66 may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

Figure 4:
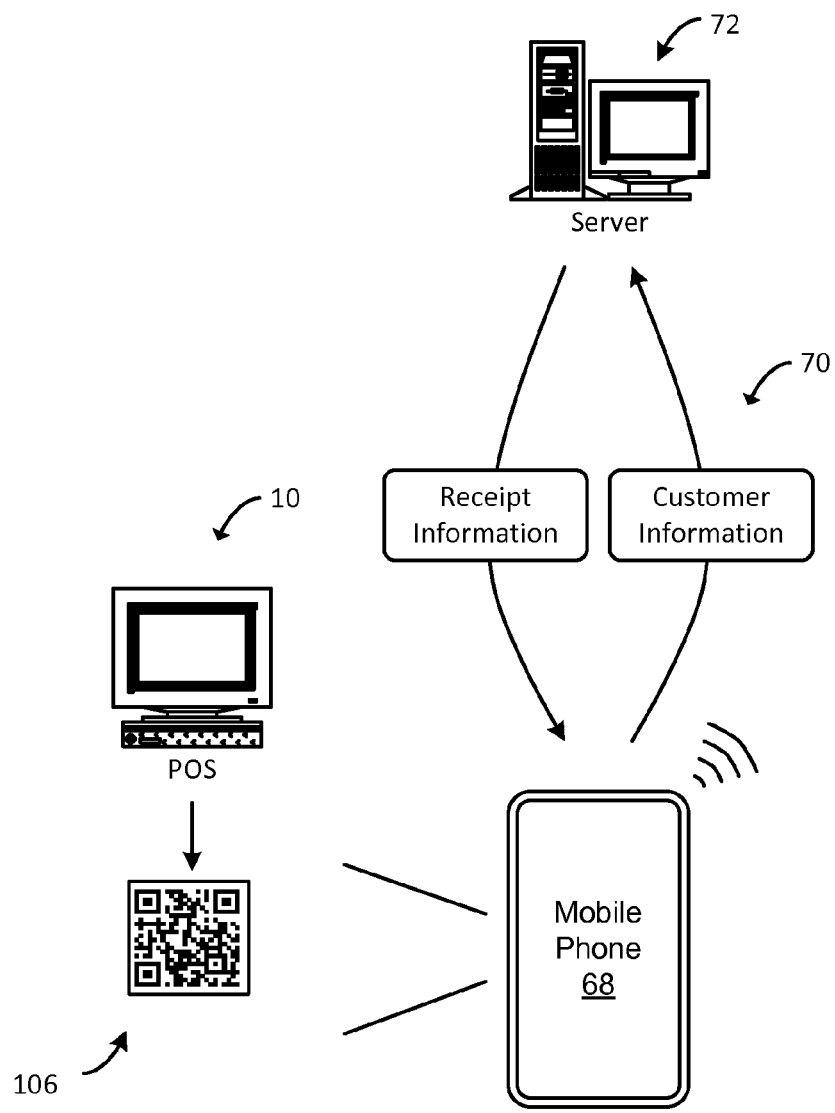
FIG. 4 is a block diagram illustrating the flow of data within one embodiment of a system in accordance with the present invention.

Referring to FIG. 4, a customer may download or may already have downloaded electronic receipts software to a mobile electronic device 68. The mobile electronic device 68 may be a smart phone, tablet PC, etc. A customer may have previously received a paper receipt 46 which includes an invitation to use electronic receipts instead of paper receipts and may have installed electronic receipts software on the mobile electronic device 68.

As indicated at 70, the customer may have an account with the computer server 72 and may transmit information to the server 72. It will be appreciated that the functionality of server 72 may be implemented by servers 26, 34, etc. The computer server 72 may likewise transmit information to the mobile device 68. The customer may receive electronic receipts on the mobile device 68 and the electronic receipts software on the mobile device 68 may enable them to manage electronic receipts. Additionally, the electronic receipts software may allow the customer to interact with a POS terminal 10 via the mobile electronic device 68, such as through machine readable code like QR code 106.

Figure 5:
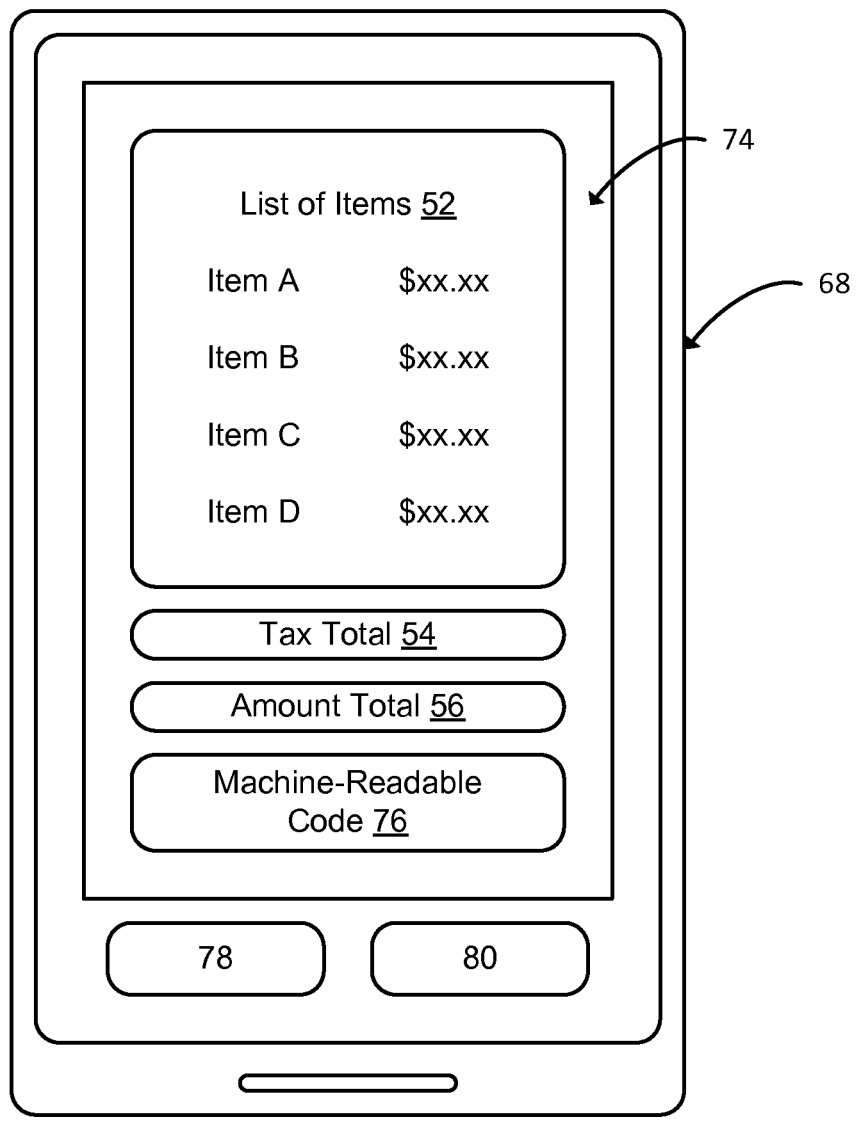
FIG. 5 is a schematic block diagram of one embodiment of a receipt viewed on a mobile electronic device in accordance with the present invention.

Referring to FIG. 5, the mobile electronic device 68 may display an electronic receipt 74 to the customer in a manner similar to the appearance of a paper receipt 46. The electronic receipts software on the mobile electronic device 68 allows a person to view their electronic receipts and to manage their receipts in many ways similar to a paper receipt. The software may provide menus, commands, or virtual buttons 78, 80 to the customer to facilitate completion of the various steps for managing electronic receipts which are discussed herein.

Figure 6:
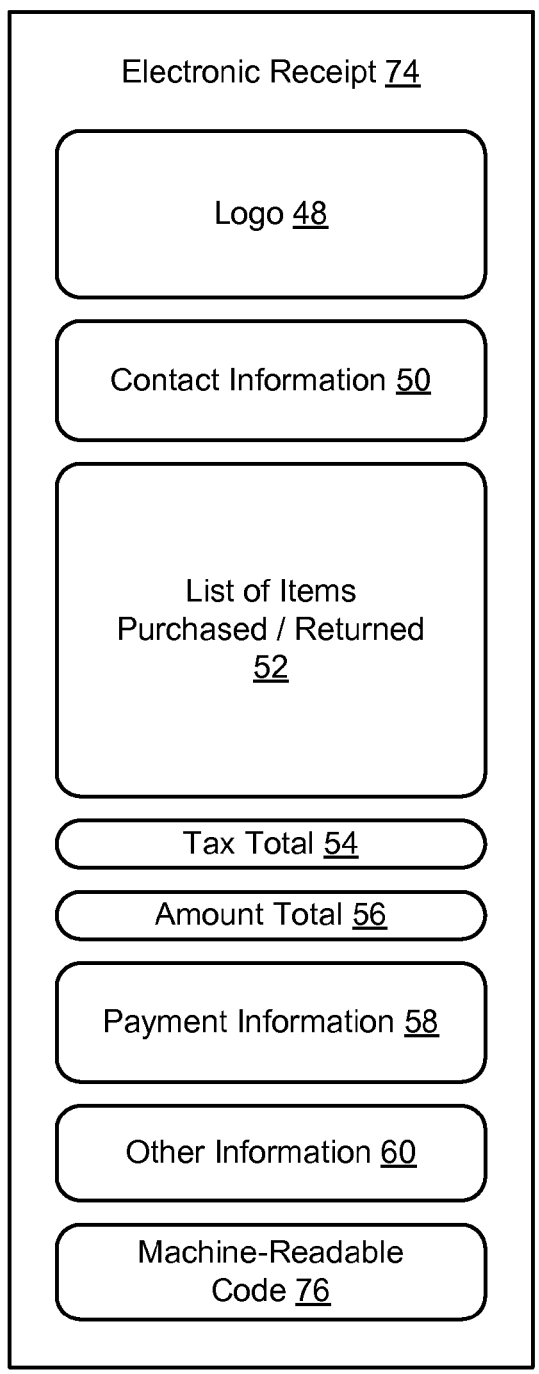
FIG. 6 is a schematic block diagram of one embodiment of a receipt in accordance with the present invention.

Referring to FIG. 6, the electronic receipt 74 is shown in greater detail. As discussed, a POS system 10 may output an electronic receipt 74 to a customer who has elected to receive an electronic receipt instead of a paper receipt. An electronic receipt 74 is often presented to a customer in a manner which is similar to a paper receipt 46. The electronic receipt 74 may include a store logo 48, contact information 50, a list 52 of items purchased or returned, a total 54 indicating the sales tax assessed or returned, a total 56 indicating 56 the amount paid or returned, payment information 58, a machine readable code 76 identifying the transaction, and other information 60 as desired, as well as combinations or sub-combinations thereof.

A machine-readable code 76 may comprise a barcode. For example, in certain embodiments, a machine-readable code 76 may comprise a conventional barcode or a two-dimensional barcode such as a QR code. Two-dimensional barcodes may support or provide more data per unit area than can be obtained using a traditional one-dimensional barcode. Moreover, two-dimensional barcodes are typically configured to be captured using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

As regards the management of electronic receipts, the data encoded within a machine-readable code 76 may encode a transaction identification (ID). A transaction ID may uniquely identify a particular transaction (e.g., a transaction documented by a corresponding receipt 74). The machine-readable code 76 may include a data hash of desired information describing the purchase transaction. For example, the code 76 may contain the store and POS terminal where the transaction occurred, the time of the transaction, the total price of the transaction, etc. With such information, a returns associate may scan in the machine-readable code 76 or key in a corresponding numerical code and obtain sufficient information to demonstrate the legitimacy of the receipt or otherwise work with the receipt.

The use of electronic receipts may conserve natural resources by reducing the need for and consumption of paper. Electronic receipts may also enable a consumer to more easily track and keep a highly detailed record of his or her spending. Entities issuing electronic receipts may benefit from additional marketing opportunities that the electronic receipts provide. There are, however, some disadvantages to electronic receipts. In some situations companies may require a paper receipt for reimbursement, accounting, etc. Accordingly, there are times when it is desirable for a customer to obtain a paper receipt corresponding to the electronic receipt.

Figure 7:
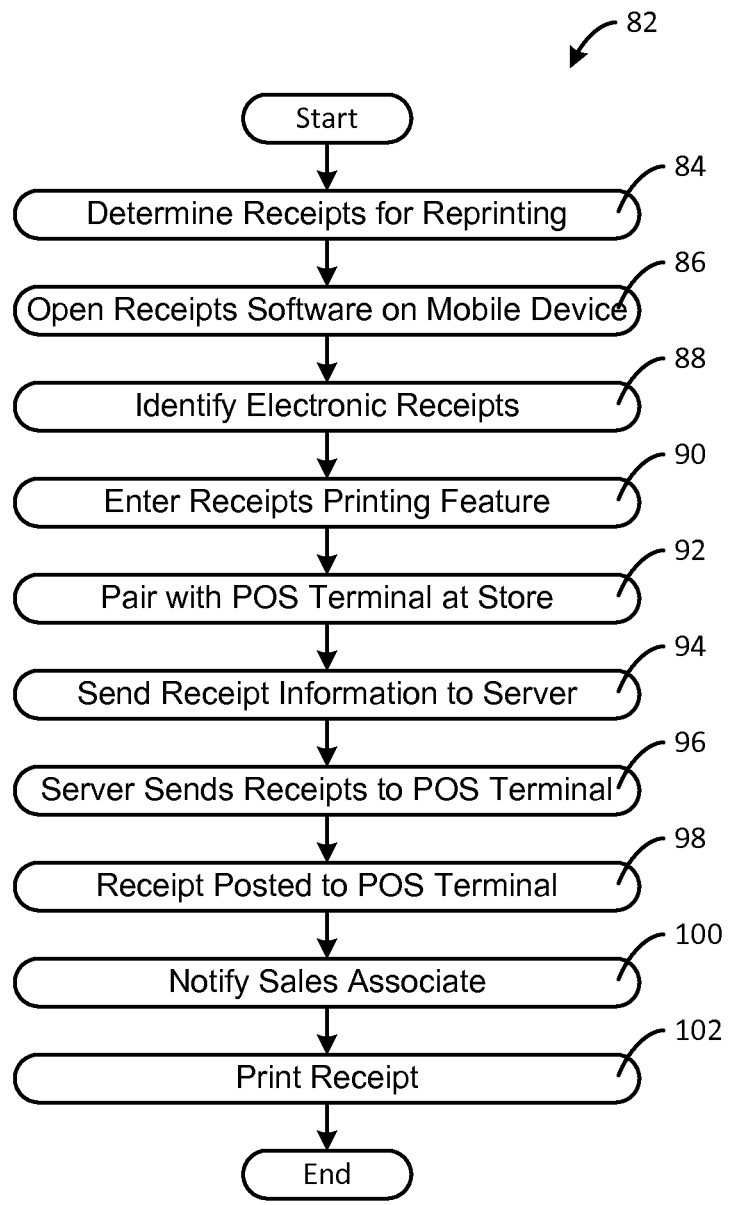
FIG. 7 is a block diagram of one embodiment of a method for printing a paper copy of a receipt in accordance with the present invention.

Referring to FIG. 7, a customer may use the electronic receipts software to manage their electronic receipts and more specifically to reprint a paper receipt. FIG. 7 generally illustrates the process 82 which is used to reprint a paper receipt from an electronic receipt 74. With electronic receipts software, the customer will have access to the receipt 74 on their electronic device 68. In order to make the receipts more usable to the customer, it is desirable to provide enhanced functionality as compared to simply providing the customer with an image of the receipt. The software may perform many functions allowing the customer to perform tasks such as reviewing receipts, and also allowing the customer to print paper receipts from the electronic receipt or data used to construct the electronic receipt.

Generally, a person will first determine 84 if they have any receipts for reprinting. There may be many reasons why a person would reprint a receipt. They may need a paper copy of a receipt for accounting, reimbursement, taxes, etc. Depending on the reason for reprinting a receipt, the receipt may be reprinted in a different manner. The person may open 86 electronic receipts software on a mobile electronic device in order to manage their receipts. They may then identify 88 one or more electronic receipts for reprinting. The person may enter 90 a receipt printing feature within the electronic receipts software and may indicate selected receipts for reprinting. The person would then typically pair 92 with a POS terminal at the store from which the receipts originated. Information is then sent 94 to a server 26, 43, 72 to identify receipts for reprinting. The server then sends 96 receipt data to the POS terminal for printing and the receipts are posted 98 to the POS terminal. The server may know which store and which POS terminal to send the receipt data to due to the pairing between the mobile electronic device and the POS terminal. The server may also notify 100 the sales associate that a receipt is being reprinted for the customer. The POS terminal reprints 102 the receipt.

The electronic receipts software may allow the customer to select one or more receipts in different manners. For example, the software may allow the customer to select the last receipt for reprinting. The software may allow the customer to select multiple receipts for printing, such as selecting all receipts in a given time period for reprinting.

In selecting 88 a receipt for reprinting, the customer may determine that a receipt should be reprinted for a particular purpose. The customer may need to submit a receipt to their employer for a reimbursement, or may need a paper receipt for other tax or accounting purposes. Where a customer purchased additional personal items in the same transaction, the customer may not want those items included on the receipt which is submitted. The electronic receipts software may thus allow the customer to select a purpose for submitting the receipt and modify the presentation or the content of the receipt. The electronic receipts software may allow the customer to select a receipt and indicate that the receipt should be separated to show different items on different printed receipts or that a redacted version of the receipt should be printed. After selecting the receipt, the electronic receipts software may allow the customer to indicate which items should appear on the redacted receipt and print a receipt that shows those items along with the associated taxes, etc.

The electronic receipts software may allow a person to reprint a receipt which includes only particular items for various reasons. In some cases, a customer may need to submit a receipt to activate a warrantee. The customer may then select a receipt and reprint the receipt showing only the desired item along with the taxes and other receipt parts associated with that item. A customer may need to submit a receipt for a work reimbursement and may similarly desire to only submit work related items on that receipt. A customer may need to submit a receipt to an accountant or save a paper copy of a receipt for tax or accounting purposes and may desire that only relevant items appear on the receipt. A customer may also desire to provide a receipt with a gift and desire that only the gift item(s) are displayed on the receipt. In these cases, the customer may enter a paper receipt reprint function within the electronic receipts software, select the desired receipt within the electronic receipts software, select those items on the electronic receipt which should appear on the reprinted paper copy of the receipt, and finalize the reprinting of that receipt.

The electronic receipts software may allow the customer to print the receipt in different formats. As discussed above, the receipt may be printed in a redacted format where only items which are relevant to a particular use of the receipt are included. In addition, the electronic receipts software may allow the customer to reprint the receipt in a different format which is better suited to accountants or which is better suited for warrantee purposes, or may print the receipt in the exact format of the original receipt. Additionally, the receipt may be reprinted with a different header, such as by indicating that the receipt is a reprinted copy.

In some cases, additional transactions which are related to the original receipt may have been completed by the customer. For example, the customer may have returned or exchanged one or more items from the original purchase. These transactions may not be apparent on the original receipt. The receipts printing system may thus print additional receipts related to the original transaction. When a customer requests that a receipt is reprinted, the electronic receipts software may ask the customer if they want to reprint related receipts as well. If desired, the server may then send related receipts to the POS terminal for printing. If desired, the server could automatically send related receipts to the POS terminal for printing. Additionally, related receipts and transactions could be grouped together onto a single receipt for convenience. Where an item has been returned, for example, the server could indicate that the item was returned on the original receipt. The original receipt may have a line through that item and may indicate the date on which that item was returned.

Figure 8:
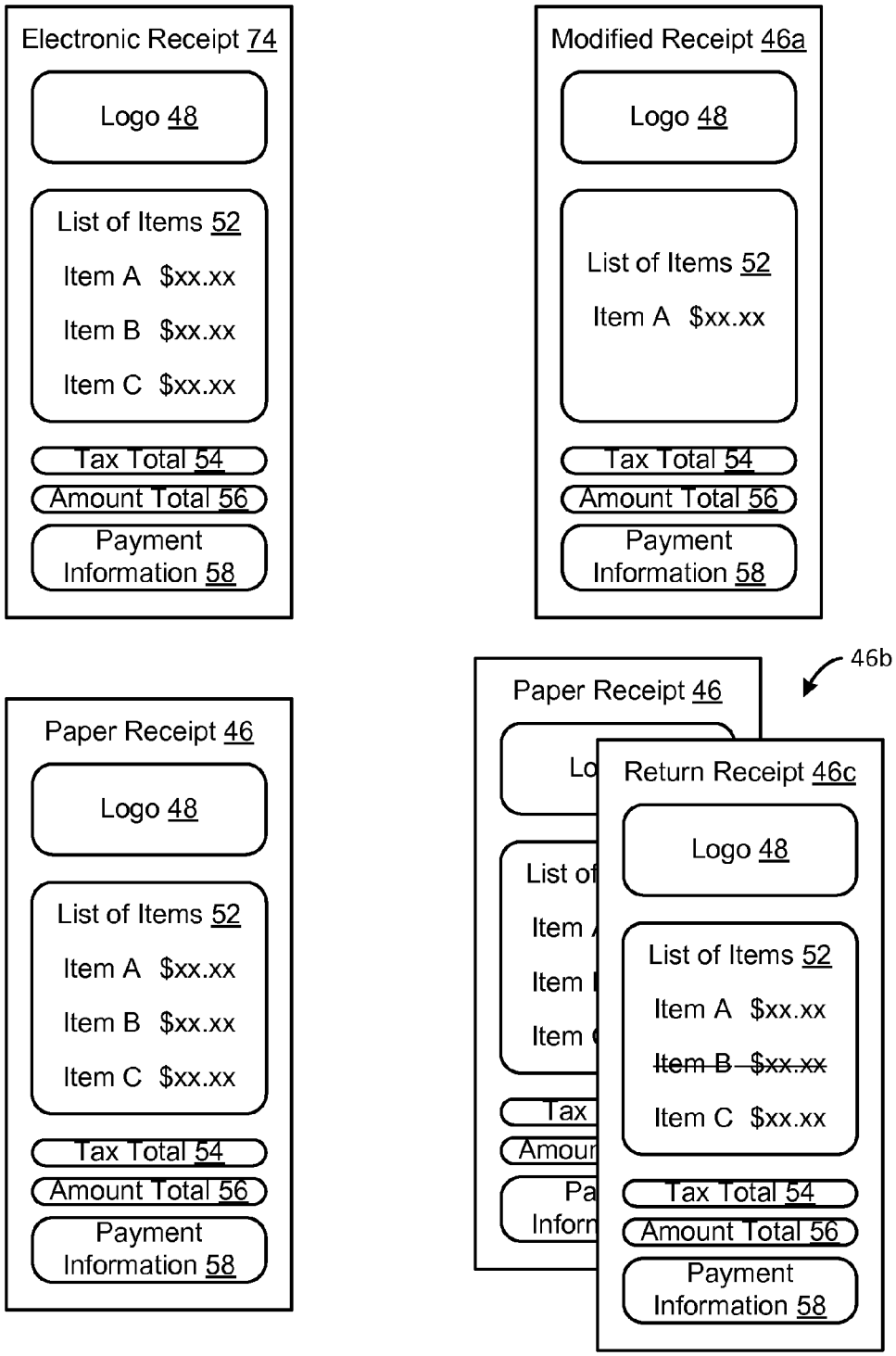
FIG. 8 shows schematic diagrams of various receipts according to the present invention.

Referring to FIG. 8, receipts which have been reprinted from an electronic receipt according to the present system are shown. An electronic receipt 74 was obtained by a customer who has elected to receive electronic receipts via electronic receipts software and who made a purchase. The customer may desire to reprint a paper copy of the receipt. Accordingly, the customer may print a paper copy 46 of the electronic receipt 74 as discussed herein. The customer may desire and may thus print a redacted version or modified version 46a of the electronic receipt 74 as discussed. The customer may desire to reprint a full receipt history 46b including any additional receipts 46c relating to the transaction of the original receipt 74.

Figure 9:
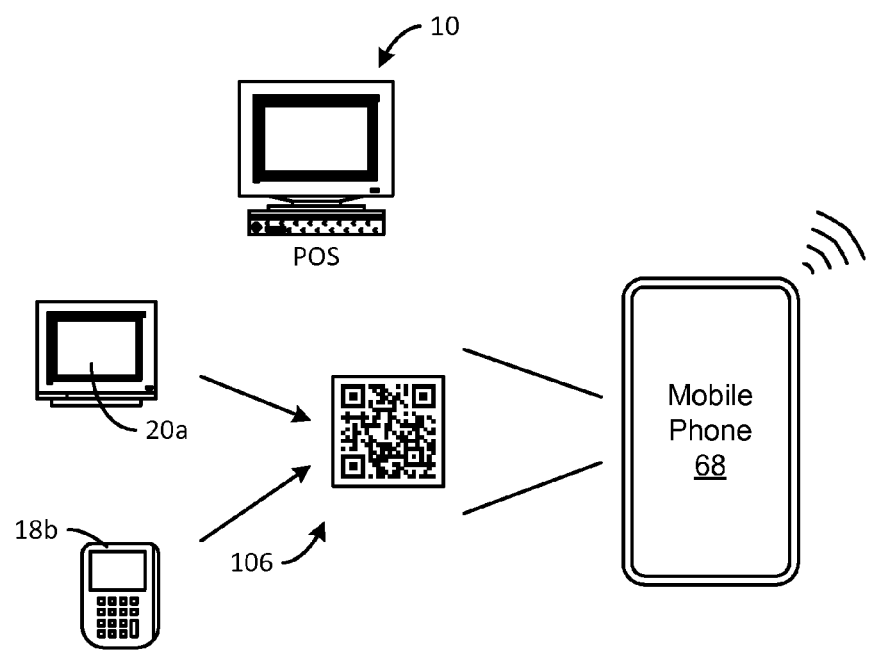
FIG. 9 is a block diagram illustrating a method of pairing a mobile electronic device with a POS terminal according to the present invention.

Referring to FIG. 9, the customer will typically pair 92 with a POS terminal 10 in order to reprint the receipts. According to one implementation of the invention, the customer may capture a QR code 106 to pair with the POS terminal. The QR code may be displayed to the customer on the screen of a debit card reader 18b or another customer facing screen 20a. Traditional checkout registers may only have a debit card reader where self-checkout registers may often have a larger customer facing display screen. The QR code may be displayed on either of these screens and the customer may use the camera features of their mobile electronic device 68 to capture the QR code.

The QR code may be a static code which identifies the particular POS terminal and store where the customer is located. Additionally, the QR code may have a dynamic component such as a security number. A portion of the QR code may change at periodic intervals to make the QR code more secure. In such a configuration, the QR code may contain a numeric payload which changes periodically, the number may be known to a central server or may be provided to the POS terminal by a central server. The use of a dynamic code may make it more difficult for a person to send large quantities of receipts to a POS terminal for printing without being present at the terminal, and thus may limit abuse of the system. If it is not possible to use a machine readable code such as a QR code, the customer may key in an identification code to identify the particular POS terminal.

In pairing with the register, the customer may also manually enter a code into their mobile electronic device 68. Some mobile electronic devices 68 may not have the ability to capture a machine readable code 106. Some store locations may not have the ability to present a desired type of machine readable code. Accordingly, the customer may enter identifying information into the POS terminal, such as by entering their phone number into a keypad such as on a debit card reader 18b. This phone number may be the phone number associated their mobile electronic device and their customer account with the retailer. The POS terminal may then provide the customer with an alpha-numeric code which they can enter into their mobile electronic device 68. The code can be a code which is created and which is known to the server 26, 34, 72. The code can expire within a period of time such as a few minutes to allow for some control over the receipt reprinting process.

If desired, a kiosk may be used to reprint receipts instead of a POS terminal. In such a situation, the customer may pair their mobile electronic device to the kiosk instead of a POS terminal in the manners discussed. The other steps of the process proceed in a similar manner to deliver and print the receipt. Pairing 92 with a particular register may serve as an authentication that the request for receipt reprinting is legitimate. Additionally, pairing with a particular register provides information to the server (26, 34, 72) to identify the register and allow the register to print the receipt at the desired location.

Figure 10:
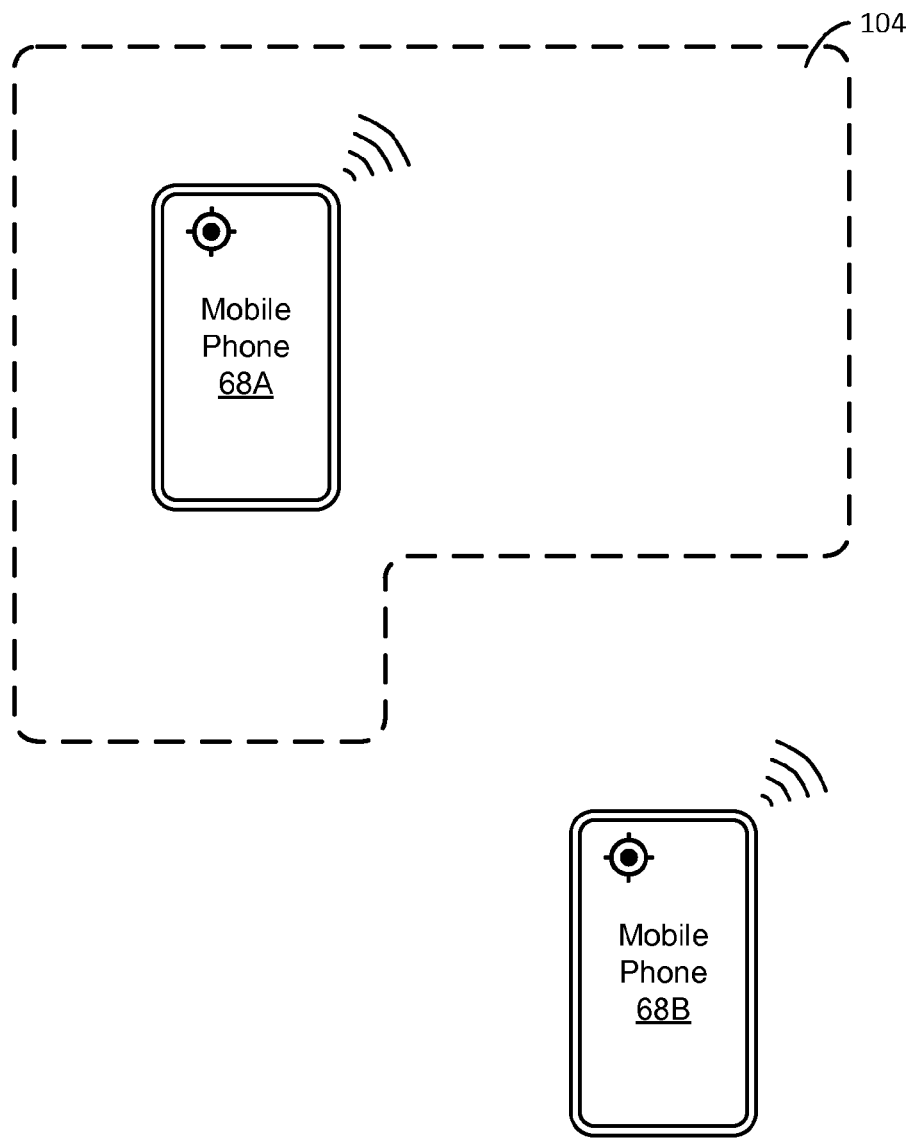
FIG. 10 is a block diagram of one embodiment of a method for verifying the location of a mobile electronic device in accordance with the present invention.

Referring to FIG. 10, geofencing can be used to verify that the customer is likely at a POS terminal. The electronics receipts software may activate a GPS unit within the mobile electronic device 68 to determine the location of the device. The electronic receipts software may then compare the location of the mobile device 68 with the known geographic perimeter or location of a store 104 to determine if a customer is likely in the store 104 or not.

By way of example, the electronic receipts software may communicate the location of the mobile electronic device 68 to an electronic receipts server and the server may compare the location of the device 68 to known store locations. Alternatively, the electronic receipts software may include data identifying the geographic locations of the stores near the customer. This data may be downloaded when the customer installs the software, or may be downloaded as necessary due to the customer using the electronic receipts software.

By comparing the location of the mobile electronic device 68 with the geographic perimeter or location of a store 104, the electronic receipts software may distinguish whether the mobile device 68 is inside of or near to the store (68A) or at a location outside of or farther away from the store (68B). If the mobile electronic device 68 is likely inside of a store 104, the electronic receipts software may use this as a higher degree of confirmation that the customer and the mobile electronic device is in a particular store. The electronic receipts software may use provide this information to the server. Moreover, if the location of the customer can be verified, the code used to identify the POS terminal in pairing the mobile electronic device with the POS terminal can be simplified. This may be particularly advantageous where the customer is manually entering a code.

Figure 11:
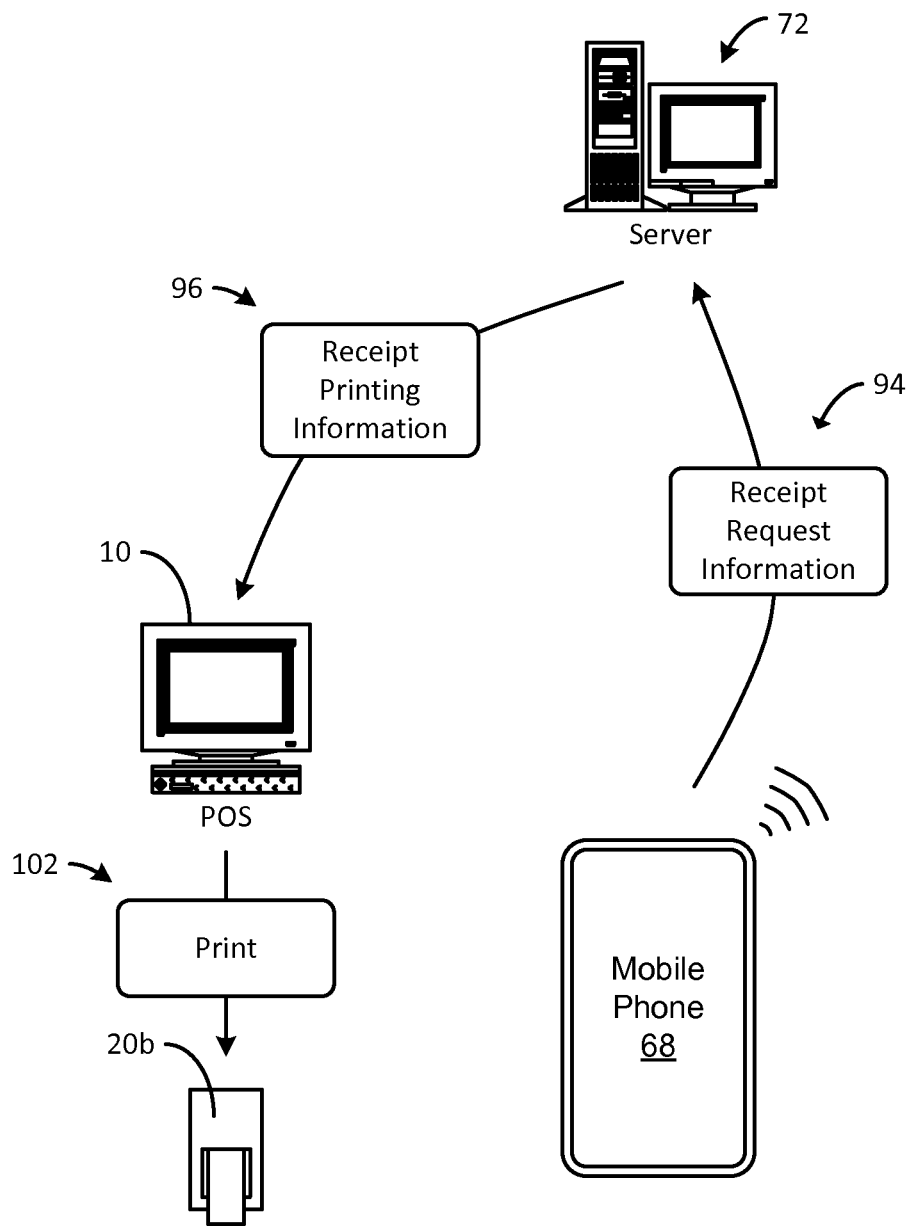
FIG. 11 is a block diagram illustrating the flow of data within one embodiment of system in accordance with the present invention.

Turning now to FIG. 11, the general flow of information for reprinting receipts is shown. After the customer has paired with a POS terminal 10, the mobile electronic device will typically send 94 receipt information to a server 26, 34, 72 over the mobile electronic device network. The receipt information will contain the information necessary to request reprinting the receipts. The mobile electronic device may send the server information identifying the particular POS terminal (as may be obtained when pairing with the POS terminal), information identifying the particular receipt or receipts for reprinting, information regarding particular print formatting of the receipts, as well as other necessary information.

The POS terminal 10 may often maintain a heartbeat signal with the server 26, 34, 72. The POS terminal may expect that a receipt is being delivered for printing because the mobile electronic device 68 paired with the POS terminal. The POS terminal may then poll the server for receipt data. The server may deliver 96 the receipt data to the POS terminal 10 and the receipts which are to be printed may be posted 98 to the POS terminal. Typically, the server will deliver the receipts to the register in the same format that the POS terminal typically uses for creating and printing receipts, allowing the POS terminal and the receipt printer 20b to understand the receipt information.

The POS terminal 10 may notify the sales associate that a receipt has been received for a customer. The sales associate may then cause the receipt to be printed when the customer is ready for the receipt. Alternatively, the POS terminal may automatically print the receipt when ready. In either case, the receipt may be sent to a receipt printer 20b and printed 102. The sales associate may hand the customer the receipt. It will be appreciated that when the customer requests reprinted receipts at a self-checkout POS terminal or at a receipt reprinting kiosk, the steps handled by a sales associate may be handled by the customer or automatically as desired. The receipt may be directly presented to the customer.

Figure 12:
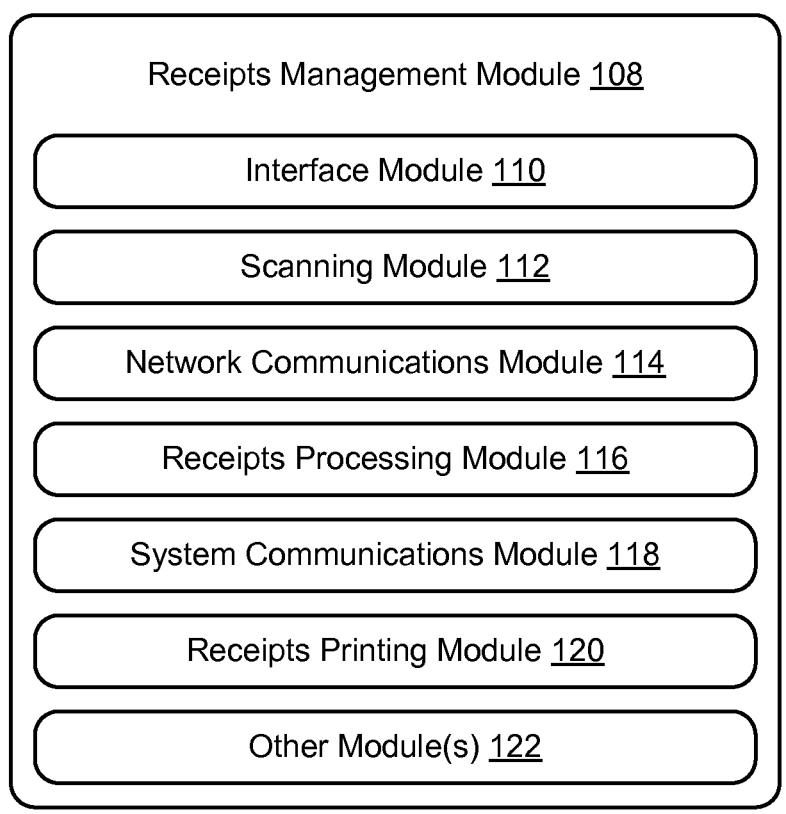
FIG. 12 is a schematic block diagram of one embodiment of a receipts printing module in accordance with the present invention.

Referring to FIG. 12, a computer system in accordance with the present invention may include a receipts management module 108. The various functions or modules of a receipts management module 108 may be enacted or implemented by any suitable system or component thereof. For example, in selected embodiments, one or more functions or modules of a receipts management module 108 may be distributed across one or more hardware devices, including a mobile electronic device 68, a primary computer 12 of a POS system 10, a local server 26, a supervisory server 34 or 72, some other onsite resource, some other offsite resource, or the like or combinations or sub-combinations thereof. Thus, systems and methods in accordance with the present invention may be adapted to a wide variety of situations, including more rigid legacy systems.

In selected embodiments, a receipts management module 108 facilitates the receipts printing process described herein. The receipts management module may include any suitable arrangement of sub-components or modules. The receipts management module 108 may include an interface module 110 which interfaces with a customer. The interface module may include a display on a mobile electronic device 68. The receipts management module 108 may also include a scanning module 112 which may include a camera on a mobile electronic device 68 and which facilitates scanning machine readable codes such as QR codes. The receipts management module 108 may include a network communications module 114 which may facilitate communications between the mobile electronic device 68 and the server 26, 34, 72.

The mobile self-checkout module 108 may include a receipts processing module 116 which may facilitate processing receipts and preparing receipts for reprinting. The mobile self-checkout module 108 may include a system communications module 118 which may communicate between a POS terminal 10 and a server 26, 34, 72 and which may transmit receipt information from the server to the POS terminal. The mobile self-checkout module 108 may also include a receipts printing module 120 which facilitates printing receipts for the customer at a store. The mobile self-checkout module 108 may also include other modules 122 as are desirable to implement aspects of the present invention. The various modules and parts of the mobile self-checkout module 108 may include both hardware, firmware and software components as are desirable to accomplish the present invention and to achieve the various steps, features, and functionality discussed herein.

The flowchart and block diagrams of the Figures illustrate the architecture, functionality, and operation of possible implementations of systems, methods, and computer program products according to one or more embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method for printing a paper copy of a receipt from an electronic receipt comprising:
    operating electronic receipts application software on a mobile electronic device;
    rendering, by the electronic receipts application on the mobile electronic device, images of a plurality of electronic receipts being stored on the mobile electronic device;
    receiving, by the electronic receipts application via the mobile electronic device, a user selection of an electronic receipt of the plurality of electronic receipts;
    displaying the selected electronic receipt on the mobile device and receiving a user selection of at least one item included with the selected electronic receipt;
    capturing, by the mobile electronic device, a machine readable code being displayed on a POS terminal;
    determining, by the electronic receipts application, GPS data indicating a location of the mobile electronic device;
    transmitting, by the electronic receipts application via the mobile electronic device, a signal including the machine readable code including a POS terminal ID and the GPS data to a receipts management server;
    identifying, by the receipts management server, the POS terminal as a function of the received POS terminal ID;
    determining, by the receipts management server, a current location of the mobile electronic device as a function of the received GPS data;
    pairing the mobile electronic device with the POS terminal upon determining the current location of the mobile electronic device is proximate to the POS terminal;
    transmitting, by the electronic receipts application via the mobile electronic device, a request to print a modified electronic receipt to the receipts management server, the request to print a modified electronic receipt including information indicating the selected electronic receipt and the user selection of at least one item included with the selected electronic receipt;
    receiving, by the receipts management server, the information indicating the selected electronic receipt and the user selection of at least one item from the mobile electronic device, accessing a database, and selecting receipt data corresponding to an original electronic receipt associated with the user selected electronic receipt;
    creating, by the receipts management server, a modified electronic receipt using the selected receipt data corresponding to an original electronic receipt and the user selection of at least one item;
    generating receipt information corresponding to the modified electronic receipt for use in printing the modified electronic receipt;
    transmitting, by the receipts management server, the generated receipt information corresponding to the modified electronic receipt to the POS terminal; and
    printing a paper copy of the modified electronic receipt at a receipts printer associated with the POS terminal.

2. The method of claim 1, wherein the electronic receipts application allows the user to select items to appear on the printed paper copy of the modified electronic receipt, the method further comprising the receipt management server creating the modified electronic receipt including only items selected by the user.

3. The method of claim 1, wherein transmitting information to a receipts management server comprises the mobile electronic device transmitting information to the receipts management server over the mobile electronic device's communications network.

4. The method of claim 1, further comprising the POS terminal notifying a sales associate that the modified electronic receipt has been received by the POS terminal and printing the modified electronic receipt upon receiving a request from the sales associate.

5. The method of claim 1, further comprising calculating sales tax associated with the user selected items and creating the modified electronic receipt including the calculated sales tax.

6. The method of claim 1, further comprising the receipt management server generating the receipt information including the modified electronic receipt being displayed with the user selected item in redacted form.

7. The method of claim 1, further comprising the electronic receipts application operating a camera of the mobile electronic device to capture the machine readable code including a POS terminal ID.

8. The method of claim 1, wherein the machine readable code comprises a dynamic security component.

9. The method of claim 1, wherein the POS terminal displays the machine readable code on a display device associated with POS terminal.

10. The method of claim 1, wherein further comprising the electronic receipts application allowing the user to select one or more of the displayed electronic receipts.

11. The method of claim 1, further comprising printing a paper copy of the selected electronic receipt and the modified electronic receipt.

12. The method of claim 11, wherein the modified electronic receipt is redacted to only show selected items.

13. The method of claim 11, wherein the modified electronic receipt is printed in a different format than the selected electronic receipt.

14. The method of claim 1, wherein printing a paper copy of the receipt comprises printing additional related receipts to show additional transactions for items on the selected electronic receipt.

15. A computer-implemented method for printing a paper copy of a receipt from an electronic receipt comprising:
    operating electronic receipts application software on a mobile electronic device;
    rendering, by the electronic receipts application on the mobile electronic device, images of a plurality of electronic receipts being stored on the mobile electronic device;
    receiving, by the electronic receipts application via the mobile electronic device, a user selection of an electronic receipt of the plurality of electronic receipts for printing as a paper receipt;
    displaying, by the electronic receipts application, the selected electronic receipt on the mobile device and receive a user selection of at least one item included with the selected electronic receipt;
    capturing, by the mobile electronic device, a machine readable code being displayed on a POS terminal;
    determining, by the electronic receipts application, GPS data indicating a location of the mobile electronic device;

transmitting, by the electronic receipts application via the mobile electronic device, a print request signal to a receipts management server including the machine readable code including a POS terminal ID, the GPS data, the selected electronic receipt, and the user selection of at least one item included with the selected electronic receipt;

receiving, by the receipts management server, the print request signal from the mobile electronic device and identifying the POS terminal as a function of the received POS terminal ID;

determining, by the receipts management server, a current location of the mobile electronic device as a function of the received GPS data;

pairing the mobile electronic device with the POS terminal upon determining the current location of the mobile electronic device is proximate to the POS terminal;

accessing, by the receipts management server, a database and selecting receipt data corresponding to an original electronic receipt associated with the user selected electronic receipt;

creating, by the receipts management server, a modified electronic receipt using the selected receipt data corresponding to an original electronic receipt and the user selection of at least one item;

generating receipt information corresponding to the modified electronic receipt for use in printing the modified electronic receipt;

transmitting, by the receipts management server, the receipt information corresponding to the modified electronic receipt to the POS terminal;

rendering a notification at the POS terminal notifying a sales associate that the modified electronic receipt has been received by the POS terminal; and printing the paper copy of the modified electronic receipt for the customer upon receiving a request from the sales associate.

16. The method of claim 15, wherein the electronic receipts application allows the user to select items to appear on the modified electronic receipt, the method further comprising the receipt management server creating the modified electronic receipt including only items selected by the user.

17. The method of claim 15, wherein printing the paper copy of the receipt comprises the POS terminal transmitting data to a receipt printer associated with the POS terminal and the receipt printer printing the paper copy of the receipt.

18. The method of claim 15, further comprising displaying a notification at the POS terminal that a receipt is reprinted.

19. The method of claim 15, further comprising receiving a selection of a purpose for reprinting the electronic receipt and the POS terminal printing the modified electronic receipt according to the purpose.

20. The method of claim 19, wherein the modified electronic receipt is redacted to show selected items.

21. A system for printing a paper copy of a receipt from an electronic receipt, comprising:

a POS terminal located at a retailer;
a printer coupled to the POS terminal for printing paper receipts;
a mobile electronic device having an electronic receipts application software for use in operating the mobile electronic device, the electronic receipts application programmed to:
  operate the mobile computing device to render images of a plurality of electronic receipts being stored on the mobile electronic device;
  receive a user selection of an electronic receipt of the plurality of electronic receipts for printing as a paper receipt;
  display the selected electronic receipt on the mobile device and receive a user selection of at least one item included with the selected electronic receipt;
  capture a machine readable code being displayed on a POS terminal using the mobile electronic device;
  determine OPS data indicating a location of the mobile electronic device; and
  generate and transmit a print request signal including the machine readable code including a POS terminal ID, the GPS data, the selected electronic receipt, and the user selection of at least one item included with the selected electronic receipt; and
a receipts management server including a processor coupled to a memory device, the receipts management server being programmed to:
  receive the print request signal from the mobile electronic device and identify the POS terminal as a function of the received POS terminal ID;
  determine a current location of the mobile electronic device as a function of the received GPS data;
  pair the mobile electronic device with the POS terminal upon determining the current location of the mobile electronic device is proximate to the POS terminal;
  access a database and select receipt data corresponding to an original electronic receipt associated with the user selected electronic receipt;
  create a modified electronic receipt using the selected receipt data corresponding to an original electronic receipt and the user selection of at least one item;
  generate receipt information corresponding to the modified electronic receipt for use in printing the modified electronic receipt; and
  transmit the receipt information corresponding to the modified electronic receipt to the POS terminal;
wherein the POS terminal displays a notification to a sales associate indicating the modified electronic receipt has been received by the POS terminal; and
wherein the POS terminal operates the printer to print the paper copy of the modified electronic receipt upon receiving a request from the sales associate.

* * * * *